(12) United States Patent
Steinkogler et al.

(10) Patent No.: US 11,480,707 B2
(45) Date of Patent: Oct. 25, 2022

(54) OPTOELECTRONIC SENSOR AND METHOD OF DETECTING OBJECTS IN A MONITORING ZONE

(71) Applicant: SICK AG, Waldkirch (DE)

(72) Inventors: Sascha Steinkogler, Waldkirch (DE); Roland Gehring, Waldkirch (DE); Konrad Winterer, Waldkirch (DE)

(73) Assignee: SICK AG, Waldkirch (DE)

( * ) Notice: Subject to any disclaimer, the term of this patent is extended or adjusted under 35 U.S.C. 154(b) by 915 days.

(21) Appl. No.: 16/262,030

(22) Filed: Jan. 30, 2019

(65) Prior Publication Data

US 2019/0243023 A1 Aug. 8, 2019

(30) Foreign Application Priority Data

Feb. 6, 2018 (DE) .......................... 102018102601.3

(51) Int. Cl.
| | |
|---|---|
| *G01V 8/26* | (2006.01) |
| *G01S 17/42* | (2006.01) |
| *G01S 7/481* | (2006.01) |
| *G01S 17/93* | (2020.01) |
| *G01S 17/931* | (2020.01) |

(52) U.S. Cl.
CPC ................ *G01V 8/26* (2013.01); *G01S 7/481* (2013.01); *G01S 7/4817* (2013.01); *G01S 17/42* (2013.01); *G01S 17/93* (2013.01); *G01S 17/931* (2020.01); *G01S 7/4811* (2013.01)

(58) Field of Classification Search
CPC .. G01V 8/26; G01V 8/18; G01S 7/481; G01S 7/4817; G01S 17/42; G01S 17/93; G01S 17/931; G01S 7/4811
See application file for complete search history.

(56) References Cited

U.S. PATENT DOCUMENTS

| | | | | |
|---|---|---|---|---|
| 10,012,723 | B2 * | 7/2018 | Lindskog | ................ G01S 17/89 |
| 11,029,393 | B2 * | 6/2021 | Li | ........................ G01S 7/4802 |

(Continued)

FOREIGN PATENT DOCUMENTS

| | | |
|---|---|---|
| CN | 104904200 A | 9/2015 |
| CN | 107430188 A | 12/2017 |

(Continued)

*Primary Examiner* — Yuqing Xiao
*Assistant Examiner* — Jempson Noel
(74) *Attorney, Agent, or Firm* — Nath, Goldberg & Meyer; Jerald L. Meyer; Stanley N. Protigal

(57) ABSTRACT

An optoelectronic sensor for detecting objects in a monitored zone is provided, wherein the sensor has a scanning unit that is movable about an axis of rotation and that has a plurality of scanning modules accommodated therein for a periodic scanning of the monitored zone and for a generation of corresponding received signals and that has a control and evaluation unit for acquiring information on the objects from the received signals; and wherein the scanning modules each comprise a light transmitter for transmitting a light beam and a light receiver for generating a respective received signal from the light beam remitted by the objects. A respective mirror element is here associated with the scanning modules to set an angle of elevation of a respective scanning plane detected by a scanning module with respect to a central scanning plane perpendicular to the axis of rotation.

12 Claims, 5 Drawing Sheets

(56) References Cited

U.S. PATENT DOCUMENTS

| | | | |
|---|---|---|---|
| 2014/0071234 A1* | 3/2014 | Millett | H04N 13/25 348/43 |
| 2014/0111812 A1* | 4/2014 | Baeg | G01S 17/87 356/610 |
| 2014/0125966 A1* | 5/2014 | Phillips | G02B 26/12 356/4.01 |
| 2015/0260843 A1 | 9/2015 | Lewis | |
| 2017/0199273 A1 | 7/2017 | Morikawa et al. | |
| 2017/0219695 A1 | 8/2017 | Hall et al. | |
| 2017/0294006 A1* | 10/2017 | Cabral | G06T 19/006 |
| 2018/0267168 A1* | 9/2018 | Kim | H02K 11/042 |
| 2018/0275257 A1* | 9/2018 | Kim | G01S 7/4817 |
| 2018/0284237 A1* | 10/2018 | Campbell | G01S 17/931 |
| 2019/0064364 A1* | 2/2019 | Boysel | G05D 1/0231 |
| 2019/0179028 A1* | 6/2019 | Pacala | B60L 3/0015 |

FOREIGN PATENT DOCUMENTS

| | | |
|---|---|---|
| DE | 19757849 B4 | 12/2004 |
| DE | 102004014041 A1 | 10/2005 |
| DE | 102014100245 B3 | 11/2014 |
| DE | 202013104715 U1 | 2/2015 |
| EP | 1503221 A1 | 2/2005 |
| EP | 2863176 A2 | 4/2015 |
| EP | 2933655 A1 | 10/2015 |
| EP | 3032275 A1 | 6/2016 |
| EP | 3518000 A1 | 7/2019 |
| JP | 2017122673 A | 7/2017 |
| WO | 9816801 A1 | 4/1998 |
| WO | 2012089420 A1 | 7/2012 |
| WO | 2016122861 A1 | 8/2016 |

* cited by examiner

OPTOELECTRONIC SENSOR AND METHOD OF DETECTING OBJECTS IN A MONITORING ZONE

FIELD

The invention relates to an optoelectronic sensor, in particular a laser scanner, for detecting objects in a monitored zone, wherein the sensor has a scanning unit that is movable about an axis of rotation and that has a plurality of scanning modules accommodated therein for a periodic scanning of the monitored zone and for a generation of corresponding received signals and that has a control and evaluation unit for acquiring information on the objects from the received signals; and wherein the scanning modules each comprise a light transmitter for transmitting a light beam and a light receiver for generating a respective received signal from the light beam remitted by the objects. The invention further relates to a method of detecting objects in a monitored zone that is periodically scanned with the aid of a scanning unit movable about an axis of rotation and having a plurality of scanning modules accommodated therein, wherein the scanning modules each transmit a light beam, after remission at the objects each of the scanning modules receive said light beam again as a remitted light beam, and each of the scanning modules generate a respective received signal; and wherein the received signals are evaluated to acquire information on the objects.

BACKGROUND

Autonomously driving vehicles for industrial applications (AGVs, automated guided vehicles) require a compact three-dimensional environmental detection for the spatial orientation and for a targeted journey. For this purpose, scanning sensor systems have been developed that deliver spatial information fast and at a large angle of view. Laser scanners are frequently used in addition to imaging systems.

Laser scanners have the advantage of delivering the 3D environmental data directly and at a high scanning rate in an environment up to 360° about their axis of rotation. In this respect, neither image processing algorithms of intensive computing power nor a large-area illumination of the environment is necessary. In addition, the amounts and densities of data to be evaluated are reduced to a minimum, which permits a fast electronic processing.

In a laser scanner, a light beam generated by a laser periodically sweeps over the monitored zone with the help of a movable, typically rotating deflection unit. The light beam reflected back by objects in the monitored zone is received again to then electronically evaluate the received signal. The time of flight is measured using a phase method or pulse method to determine the distance of a sensed object. In addition, a conclusion is drawn on the angular location of the object from the angular position of the deflection unit and the site of an object in the monitored zone is thus detected in two-dimensional polar coordinates.

The scanning movement is achieved by a rotating mirror in most laser scanners. It is, however, also known to instead have the total measurement head with light transmitters and light receivers rotate, such as is described in DE 197 57 849 B4 or EP 2 933 655 A1.

If the scanning beam is additionally varied with respect to the central scanning plane perpendicular to the axis of rotation, that is at the angle of elevation, three-dimensional measurement data are produced. On the one hand, there is in turn the possibility for this of a dynamic tilting such as known from DE 10 2014 100 245 B3, for instance. However, this requires a corresponding tilting mechanism and substantially reduces the effective scanning rate.

A second possibility is a multi-beam laser scanner that detects a plurality of scanning planes in each period. The number and the directions of the scanning beams in elevation determine the angle of view and the spatial resolution. A very different requirement can be present here depending on the application. To keep the device costs low, only so many scanning beams should be used as necessary without losing substantial environmental data for the specific application. These scanning beams have to be suitably aligned for this purpose.

Some conventional multi-beam laser scanners use a monolithic array of light transmitters or light receivers. Then, however, the scanning planes are fixed to a specific equidistant distance and are tightly packed because the space on the semiconductor material of the transmission and reception elements should be ideally used. There is thus at best still the possibility of discarding data from scanning planes not used in a specific application; however, this is not an optimized adaptation of the device, but in contrast only partly utilizes its performance capability.

DE 10 2004 014 041 A1 deals with a sensor system for obstacle recognition in the manner of a laser scanner that uses a laser array and a row of photodiodes. Such row arrangements have the disadvantages stated above that they fix equidistant, close distances of the scanning planes. In an embodiment of DE 10 2004 014 041 A1, three such scanning systems each having a laser array offset from one another by 120° in the direction of rotation are arranged and their elevation angles can be varied by a lift motor. The fields of vision detected by respective scanning systems are thus set such that they together cover a contiguous elevation angle range that is as large as possible. The scanning systems are very complex and/or expensive due to the lift motor and such a laser scanner is not inexpensive. The flexibility for an ideal adaptation of scanning beams to an application remains comparatively small despite the effort and/or cost.

In EP 2 863 176 A2, a rotating platform is disclosed on which different detection modules can rotate. In an embodiment, two scanning beams are generated perpendicular to the axis of rotation and offset by 180° in the direction of rotation for a dual channel, redundant measured value detection. No 3D measurement data are detected in this manner. In a different embodiment, a plurality of distance-measuring detection modules are aligned approximately in the direction of the axis of rotation and are tilted with respect to one another in so doing. It is not explained how this is possible constructionally and a flexible adaptation to a different application is also not described.

U.S. Pat. No. 8,767,190 B2 and, similarly, also US 2017/0219695 A1 provide a separate light transmitter and light receiver on a circuit board for each scanning plane. The circuit boards are stacked over one another on the axis of rotation at a respectively small tilt angle and a plurality of scanning planes having the same mutual angular distance are then thus detected. The expense and/or complexity for the components and their adjustment is/are high. This conventional approach is based on satisfying high demands with high costs. So many measurement data are detected that the substantial measurement data are co-detected for most applications. A large number of industrial applications, however, do not require this effort and/or cost and this abundance of measurement data at all, but rather only a selection thereof. The scanning planes are, however, fixed and a cost-saving adaptation to a specific application at an early point at the hardware side is thus not possible.

SUMMARY

It is therefore the object of the invention to provide a more flexible sensor having a plurality of scanning planes.

This object is satisfied by an optoelectronic sensor and by a method of detecting objects in a monitored zone in accordance with the respective independent claim. A plurality of scanning modules are accommodated in a scanning unit that rotates about an axis of rotation or at least pivots to and fro and thus forms a periodically moved measurement head. The scanning modules each generate a scanning beam and thereby detect a scanning plane in the course of the periodic movement. The scanning modules each comprise a light transmitter and a light receiver for this purpose. A control and evaluation unit acquires information on the objects at the respective scanned points from the received signals of the scanning modules.

The invention starts from the basic idea that the angle of elevation of the scanning beam of a respective scanning module and thus the direction of view and the angular distance of the scanning planes detected by the sensor are set suitably for an application. The angle of elevation is measured against a central scanning plane perpendicular to the axis of rotation. To set the angle of elevation suitably, a respective correspondingly inclined mirror element is associated with the scanning modules. Alternatively or additionally, the scanning modules themselves are arranged on sections of a base plate. For this purpose, the sections are movable and in particular bendable to incline them or tilt them out of the plane of the base plate.

The invention has the advantage that it is made very substantially simpler to produce a sensor, and in particular, a laser scanner, whose number and arrangement of scanning beams or scanning planes are adapted specific to the application. This not only produces a slimmer sensor, but also fewer data because precisely the measurement data relevant to the application are detected. The modular design reduces the complexity of the sensor and the production process. The adaptations are applied in this modular concept and do not require any greater revision of the design or even a new development of the sensor. Together with small manufacturing costs and a compact construction size, the sensor is particularly suitable for autonomous vehicles.

The scanning modules are preferably of identical designs with one another. A common front assembly is thereby produced that only has to be specified and validated once. The manufacturing costs fall further due to correspondingly increased volumes. Since a main component in the form of the scanning module remains unchanged in new end device variants, the product development and variant formation are considerably simplified.

The scanning modules are preferably arranged offset from one another around the axis of rotation in the peripheral direction. They accordingly form a ring or circle about the axis of rotation and thus simply have room on the base plate. The ring does not have to be complete and a used section of the ring also does not have to be equipped uniformly with scanning modules. At typical high speeds of rotation of a laser scanner, the angular offset in the direction of rotation does not play an role because the scenery can be considered practically static in the brief intermediate times for the movement from one scanning module to the next.

The mirror elements are preferably arranged at an annular mirror wheel. The mirror elements are distributed over the periphery of the mirror wheel, corresponding to the arrangement of the scanning modules. Fewer individual elements are thereby required because a plurality of mirror elements have a common carrier.

The mirror wheel preferably has angular segment dividers that separate the light beams of the scanning modules from one another. Optical crosstalk is thus particularly prevented with scanning modules tightly close to one another. The scanning modules only receive light from the angular sector for which they are responsible.

The scanning modules are preferably of a biaxial design and one transmission mirror element and one reception mirror element are provided per scanning module. A channel separation can then be provided between the transmission path and the reception path, for example as an intermediate wall or in the form of a respective transmission tube and reception tube. A coaxial design is alternatively conceivable.

The transmission mirror elements are preferably arranged at an annular transmission mirror wheel and the reception mirror elements are arranged at an annular reception mirror wheel. Mirror elements that each have a common carrier for the transmission path and for the reception path in the form of the mirror wheels are thus suitably associated with biaxially arranged light transmitters and light receivers of the scanning modules. A combination component is also conceivable that holds the two mirror wheel together, in particular in one piece.

The base plate of the scanning unit is preferably a rotating circuit board. This circuit board in particular rotates with respect to a further circuit board stationary in a base unit. The two circuit boards can act as a motor for the movement of the scanning unit about the axis of rotation by corresponding coils and magnetic structures. In addition, it is also possible to integrate a supply of the scanning unit or a data communication between the moving scanning unit and the stationary base unit into the circuit boards such as is in particular described in EP 2 933 655 A1 already named in the description. This produces a particularly compact design.

The scanning modules are preferably mounted in annular form on the rotating circuit board. They are thereby simultaneously electronically connected in a simple manner and are arranged in the correct position on a circle that is in particular centered with respect to the axis of rotation and that has a mutual angular offset in the direction of rotation.

The rotating circuit board preferably has the sections variable in their inclinations. The inclined sections for the scanning modules are therefore circuit board lugs that are bent in accordance with the inclination. Alternatively, the circuit board is planar and the inclination is achieved solely by the mirror elements.

An angular divider wheel is preferably arranged above the circuit board and has angular segment dividers that separate the light beams of the scanning modules from one another. The divider wheel alternatively provides a corresponding mirror wheel for an optical separation between the scanning modules.

The divider wheel is preferably shaped such that the changeable sections are thereby fixed at an inclination fixed by the shape. The divider wheel here satisfies a second function in addition to the optical separation. It is provided by a suitable shape that the changeable sections on which the scanning modules are located are brought into the suitable inclination or are fixed at the suitable inclination. To form different variants of sensors having different scanning planes, only the matching divider wheel then has to be produced and installed.

The sensor preferably has two to ten scanning modules. There is no hard limit that speaks against more scanning modules, but the total design does become very complex from more than ten scanning planes. A sensor having twelve scanning planes, for example, is, however, easily still conceivable.

Angles of elevation between −30° and +30° can preferably be set for the scanning modules. The surroundings of the central scanning plane perpendicular to the axis of rotation are thus roughly detected. These surroundings are particularly interesting in a number of applications, particularly also with autonomous vehicles. It is frequently sensible to fix one of the angles of elevation to 0° and thus to inter alia detect the central scanning plane.

The angles of elevation are preferably fixedly set, that is are static, again preferably already in the production process. The sensor is thus adapted to or manufactured for a specific application. The modular platform having the setting possibilities via mirror elements or changeable sections of a base plate enables a derivation of a plurality of variants from the same base device. An adjustment mechanism by which the angle of elevation can also still be varied after the installation or even in operation is preferably not present to keep the sensor simple.

The scanning modules preferably each have exactly one light transmitter and light receiver. Each scanning module is thus responsible for exactly one scanning beam. This enables an individual setting of the angle of elevation of each scanning plane. In addition, the scanning modules per se are of a simple design. Alternatively, the individual scanning module already has a plurality of scanning beams. The configuration is then not as free because the angular distance of the scanning beams is fixed within the scanning modules. A smaller total number of scanning modules is sufficient for this.

The control and evaluation unit is preferably configured to determine a distance of the object from a time of flight between the transmission of the light beams and the reception of the remitted light beams. The sensor thereby becomes distance measuring. Alternatively, only the presence of an object is determined and is output as a switching signal, for example. The control and evaluation unit can be arranged at different points in the sensor in dependence on the embodiment and can also be implemented distributed over a plurality of modules. Possible arrangements of the control and evaluation unit or of parts thereof are a scanning module, the scanning unit, or the base unit with respect to which the scanning unit is moved about the axis of rotation.

The method in accordance with the invention can be further developed in a similar manner and shows similar advantages in so doing. Such advantageous features are described in an exemplary, but not exclusive manner in the subordinate claims dependent on the independent claims.

BRIEF DESCRIPTION OF THE DRAWINGS

The invention will be explained in more detail in the following also with respect to further features and advantages by way of example with reference to embodiments and to the enclosed drawing. The Figures of the drawing show in.

DETAILED DESCRIPTION

Figure 1A:
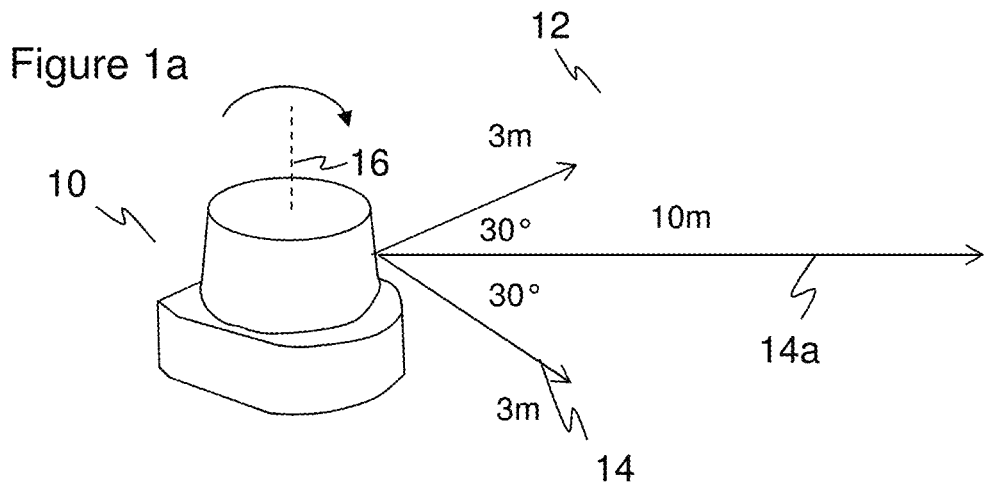
FIGS. 1a-b exemplary configurations of scanning planes of a laser scanner.
Figure 1B:
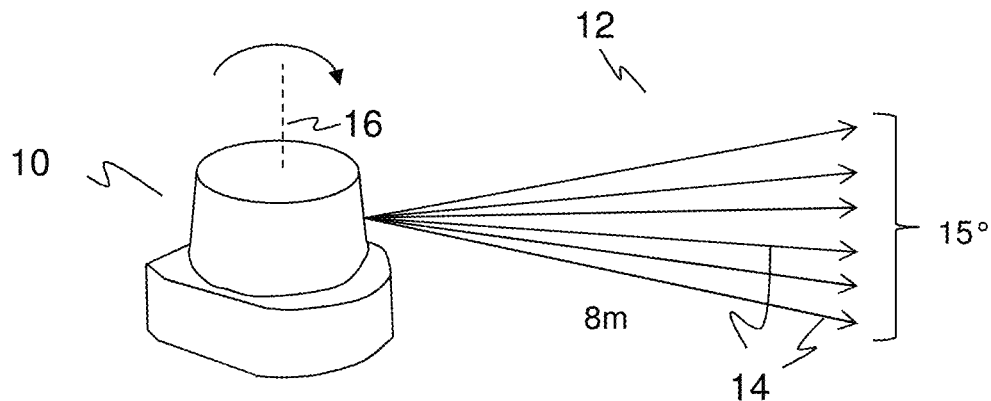

FIGS. 1a-b show two exemplary demands for a laser scanner 10 that detects a monitored zone 12 in a plurality of scanning planes 14 that are symbolized as arrows here.

FIG. 1a represents a three-layer scanner in which two lateral scanning planes 14 having a large angle of view of ±30° are detected perpendicular to the axis of rotation 16 of the laser scanner 10 beside a main plane 14a. The angular indications each relate to the angle of elevation that is measured against the central main plane 14a. The route of an autonomous vehicle is, for example, monitored using the central main plane 14a, for which purpose a range that is as large as possible, of 10 m here, is required, while the lateral scanning planes 14 deliver complementary information on the ground and on the region above the vehicle. A smaller range of 3 m here can be sufficient for this purpose.

FIG. 1b is an example of a multi-layer scanner 10 having only six scanning planes 14 at uniform angular distances of 3° in each case that overall cover an angular sector of 15°. This uniform scanning of the angular sector is carried out with a respective equal range of 8 m, purely as an example.

The range in the individual scanning planes 14 drives up costs. At a specific extraneous light load, the range is determined by properties of the transmitter, the receiver and by optical parameters such as the focal length and the aperture. A higher range therefore requires more powerful transmitters, more sensitive receivers, better optics and/or more complex evaluation processes. As a rule, a range of at most 10 m is sufficient within buildings and due to the roofing, the robustness of the extraneous light can also be reduced in comparison with the outside area, which is directly expressed in a possible reduction of costs. An even smaller range is sufficient for some scanning planes such as the lateral scanning planes 14 in FIG. 1a.

Configurations of scanning planes 14 of a laser scanner 10 within the framework of this description are determined by the number of the scanning planes 14, their angles of elevation and thus mutual angular distance as well the range. A framework particularly sensible for autonomous vehicles is set up by laser scanner types having one to ten scanning planes, positioned at any desired angles of elevation of up to ±30°. There would be simpler, conventional solutions in the selection of only one scanning plane, but there is nevertheless also this possibility. The range can be selected by corresponding hardware or parameterization, for example between 1 m and 10 m; larger ranges are conceivable as required. The amounts of data to be processed are substantially reduced due to an adaptation that is as good as possible of the scanning planes 14 to the actual demands of the application. Less processor power is thereby sufficient at smaller costs or the released resources are used for a higher scan rate.

The surface detected by a respective scanning beam is called a scanning plane 14 for reasons of simplicity. In precise terms, this applies only to the central scanning plane 14a having an angle of elevation of 0°. At other angles of elevation, it is the jacket surface of a cone that is configured as differently acute depending on the angle of elevation. A plurality of such jacket surfaces produce a scanning structure of a kind of nestling of a plurality of hourglasses. However, for reasons of simplicity, no distinction is made between a scanning plane 14a and a jacket surface 14 in this description.

Figure 2:
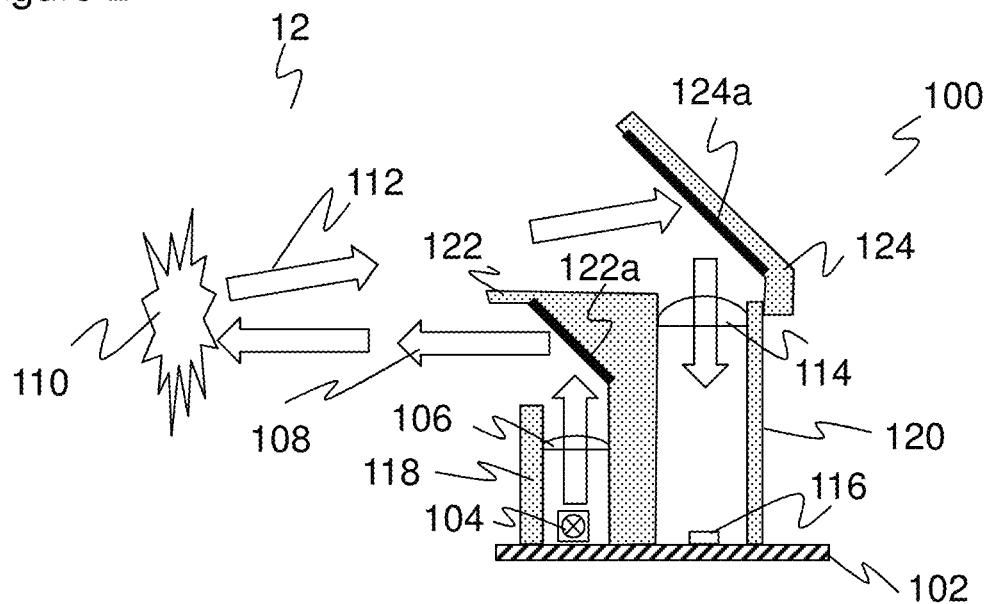
FIG. 2 a sectional representation of a scanning module with mirror elements.

FIG. 2 shows a sectional view of a scanning module 100 for a laser scanner 10. A light transmitter 104 is arranged on a modular circuit board 102; it, for example, has an LED or a laser in the form of an edge emitter or VCSEL (vertical cavity surface emitting laser diode) that generates a transmitted light beam 108 that is transmitted into the monitored zone 12 with the aid of a transmission optics 106.

If the transmitted light beams 108 are incident on an object 110 in the monitored zone 12, corresponding remitted light beams 112 return to the scanning module 100. The fact that transmitted light beams 108 and remitted light beams 112 do not extend in a direct counter-direction, but rather a little obliquely, is due to the scale with the extremely near object 110. This slanted position is practically not present at customary measurement distances. The remitted light beams 112 are guided by a reception optics 114 to a light receiver 116. The light receiver 116 is, for example, a photodiode or an APD (avalanche photodiode), preferably a SPAD (single photon avalanche diode) receiver, also called a SiPM (silicon photomultiplier). The received signal generated by the light receiver 116 is evaluated. This evaluation preferably takes place outside the scanning module 100, but alternatively at least a separate preparation of the received signal, optionally even a complete evaluation, for instance to determine the distance from the object 110 using a time of flight process is also possible within the scanning module 100.

To avoid optical crosstalk and to suppress extraneous light, the transmission path at the light transmitter 104 is shielded by a transmission tube 118 and the reception path at the light receiver 116 is shielded by a reception tube 120. A transmission mirror wheel 122 having a transmission mirror 122a upwardly adjoins the transmission tube 118 and accordingly a reception mirror wheel 124 having a reception mirror 124a adjoins the reception tube 120. The term mirror wheel can only be understood later with an annular multiple arrangement of scanning modules 100. For the individual scanning module 100, it is simply a carrier that can alternatively also be provided separately for a scanning module 100 and is not annular or circular.

The transmitted light beam 108 does not exit the scanning module 100 in a direct manner, but is previously deflected at the transmission mirror 122a. The remitted light beam 112 accordingly does not move to the light receiver 116 in a direct manner, but is rather previously deflected at the reception mirror 124a. The angle at which the transmission mirror 122a and the reception mirror 124a are therefore determines the angle at which the transmitted light beam 106 exits the scanning module 100 or at which the remitted light beam 112 is received again. The inclination or tilt of the transmission mirror 122a and of the reception mirror 124a thus fixes the angle of elevation of the scanning module 100.

Alternatively to the biaxial arrangement shown in FIG. 2 having the transmission path and the reception path disposed next to one another, a coaxial arrangement is also conceivable in the scanning module 100. Instead of separate transmission and reception mirror wheels 122, 124, a common mirror wheel having a common deflection mirror is then sufficient.

Figure 3:
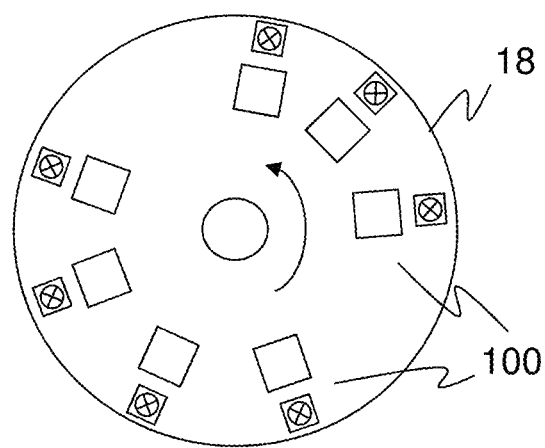
FIG. 3 a plan view of a base plate of a scanning unit of a laser scanner with scanning modules arranged thereon offset in the direction of rotation.

FIG. 3 shows a plan view of a rotating base plate, preferably a rotating circuit board 18 of a laser scanner 10. In this embodiment or mounting variant, seven scanning modules 100 having a mutual angular offset in the direction of rotation of the rotating circuit board 18 are provided that are each only shown as representative by their light transmitter and light receiver.

The scanning modules 100 are preferably the same parts, i.e. have an identical design among one another. They only differ in the inclination of the transmission mirror 122a and of the reception mirror 124a and thus in the angle of elevation of the respective scanning plane 14. It is alternatively also conceivable to use different scanning modules 100, for example having different ranges. There can inter alia be differences with respect to the light transmitter 104, the light receiver 116, and to the properties of the transmission optics 106 or reception optics 14 in optical properties such as the aperture or focal length.

The non-uniform distribution of the scanning modules 100 over the periphery is intended to illustrate how variants having different numbers of scanning planes 14 can be provided very simply. For this purpose, a maximum number of, for example, up to ten mounting positions are provided for scanning modules 100 that are not all used in dependence on the variant.

The scanning module 100 is shown with its own modular circuit board 102 in FIG. 2 and can thus be arranged as a whole transmission/reception module with or without separate evaluation electronics on the rotating circuit board 18, for instance soldered by means of a ball grid array (SMD). Alternatively, individual elements of the scanning module 100 can be arranged individually without a modular circuit board 102 or with a plurality of modular circuit boards 102 in each case for only some of the elements on the rotating circuit board 18.

Figure 4:
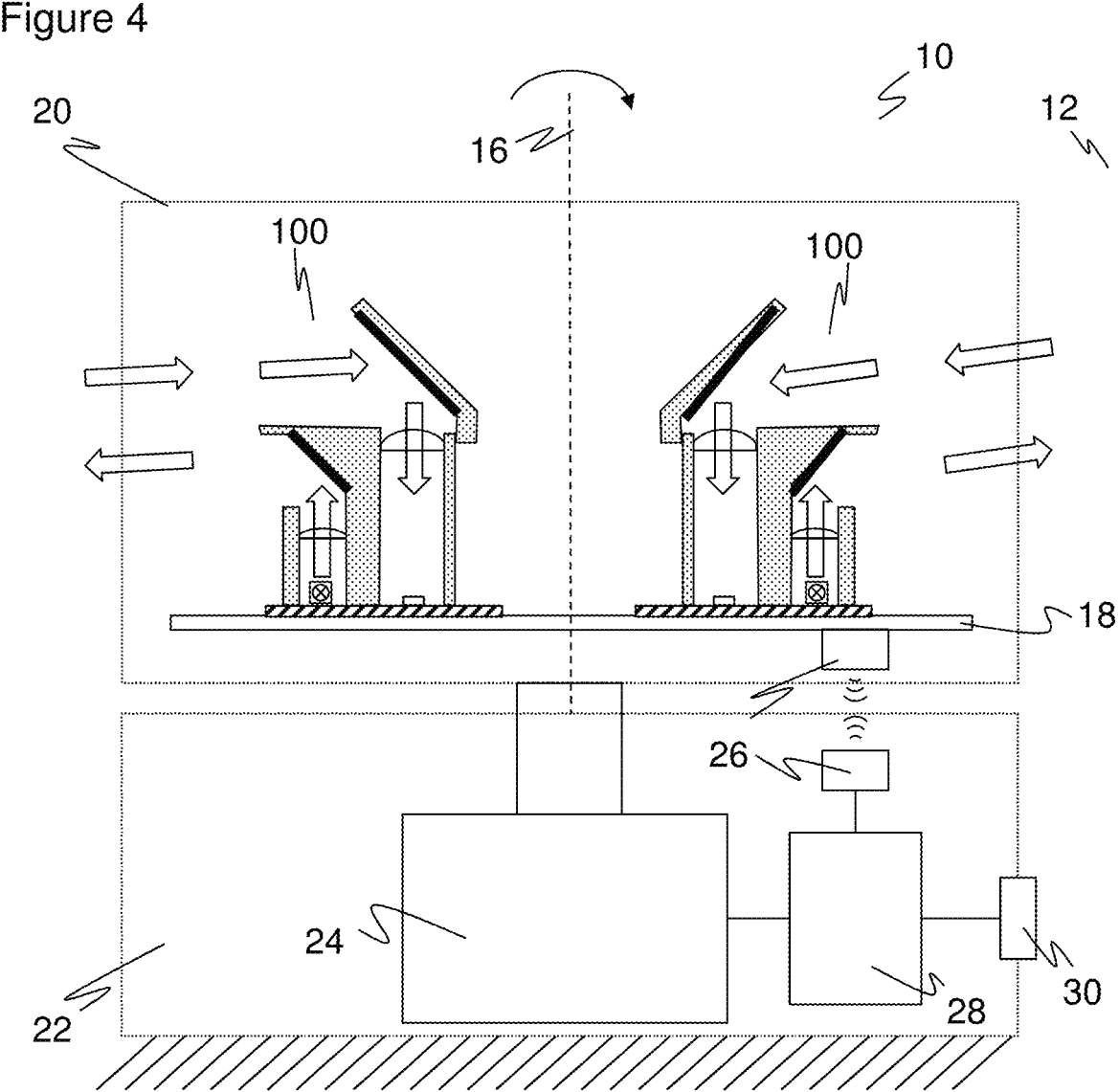
FIG. 4 a sectional representation of an optical sensor configured as a laser scanner having scanning modules in accordance with FIG. 2.

FIG. 4 shows a schematic sectional representation through an optoelectronic sensor 10 in an embodiment as a modular multi-beam laser scanner. The sensor 10 in a rough distribution comprise a movable scanning unit 20 and a base unit 22. The scanning unit 20 is the optical measurement head, whereas further elements such as a supply, evaluation electronics, terminals and the like are accommodated in the base unit 22. In operation, the scanning unit 20 is offset with the help of a drive 24 of the base unit 22 in a rotary movement or alternatively in a pivoting to and fro movement about the axis of rotation 16 in order thus to periodically scan the monitored zone 12. Differing from the representation, no separate drive 24 is required. Magnetic structures and coil structures can rather be provided in the rotating circuit board 18 and in a further circuit board, not shown and arranged in parallel therewith, of the base unit 22. A particularly compact design thereby arises.

A plurality of scanning modules 100 are provided in the scanning unit 20. In FIG. 4, only two scanning modules 100 are sown, also due to the sectional view, in general there are, as mentioned, up to ten and also more in individual cases. The individual elements of the scanning modules 100 are no longer provided with reference numerals in FIG. 4 for reasons of clarity. The design of an individual scanning module 100 has already been explained above with reference to FIG. 2. The scanning modules 100 differ in their angles of elevation and thus the respective detected scanning planes 14. In FIG. 4, the two scanning modules 100 shown detect a scanning plane 14 tilted slightly upwardly and a scanning plane 14 tilted downwardly at a slightly smaller angle. In other embodiments, different configurations of scanning planes 14 can be produced, as already shown above with reference to FIGS. 1a-b, by further scanning modules 100, in particular as explained with reference to FIG. 3, and by different inclinations of the transmission mirrors 122a and reception mirrors 124a.

A contactless supply interface and data interface 26 connects the moving scanning unit 20 to the stationary base unit 22. The supply and data interface 26 can be integrated like the motor in the rotating circuit board 18 and a non-rotating counter-piece can be integrated in the base unit 22.

A control and evaluation unit 28 is located in the base unit 22. Alternatively, the control and evaluation unit 28 can also be implemented on modules of the scanning unit 20 or of the scanning modules 100; or the functionality is distributed over a plurality of modules at different locations. The control and evaluation unit 28 controls the light transmitters 104 and receives the respective received signal of the light receivers 116 for a further evaluation. It additionally controls the drive 24 and receives the signal of an angular measurement unit which is not shown, which is generally known from laser scanners, and which determines the respective angular position of the scanning unit 20.

The distance from a scanned object 110 is measured for the evaluation, preferably using a time of flight process known per se. Together with the information on the angular position of the angular measurement unit, two-dimensional polar coordinates of all object points in a scanning plane 14 are available after every scanning period with angle and distance. A three-dimensional spatial zone is scanned overall over the plurality of scanning planes 14 of the plurality of scanning modules 100 having different angles of elevation.

The object positions or object contours are thus known and can be output via a sensor interface 30. The sensor interface 30 or a further terminal, not shown, conversely serve as a parameterization interface. The sensor 10 can also be configured as a safety sensor for use in safety engineering for monitoring a hazard source such as a dangerous machine. In this process, a protected field is monitored which may not be entered by operators during the operation of the machine. If the sensor 10 recognizes an unauthorized intrusion into the protected field, for instance a leg of an operator, it triggers an emergency stop of the machine. Sensors 10 used in safety technology have to work particularly reliably and must therefore satisfy high safety demands, for example the standard EN13849 for safety of machinery and the machinery standard EN1496 for electrosensitive protective equipment (ESPE). The sensor interface 30 can in particular be configured as a safe output device (OSSD, output signal switching device) to output a safety-directed switch-off signal on an intrusion of a protected field by an object.

Figure 5:
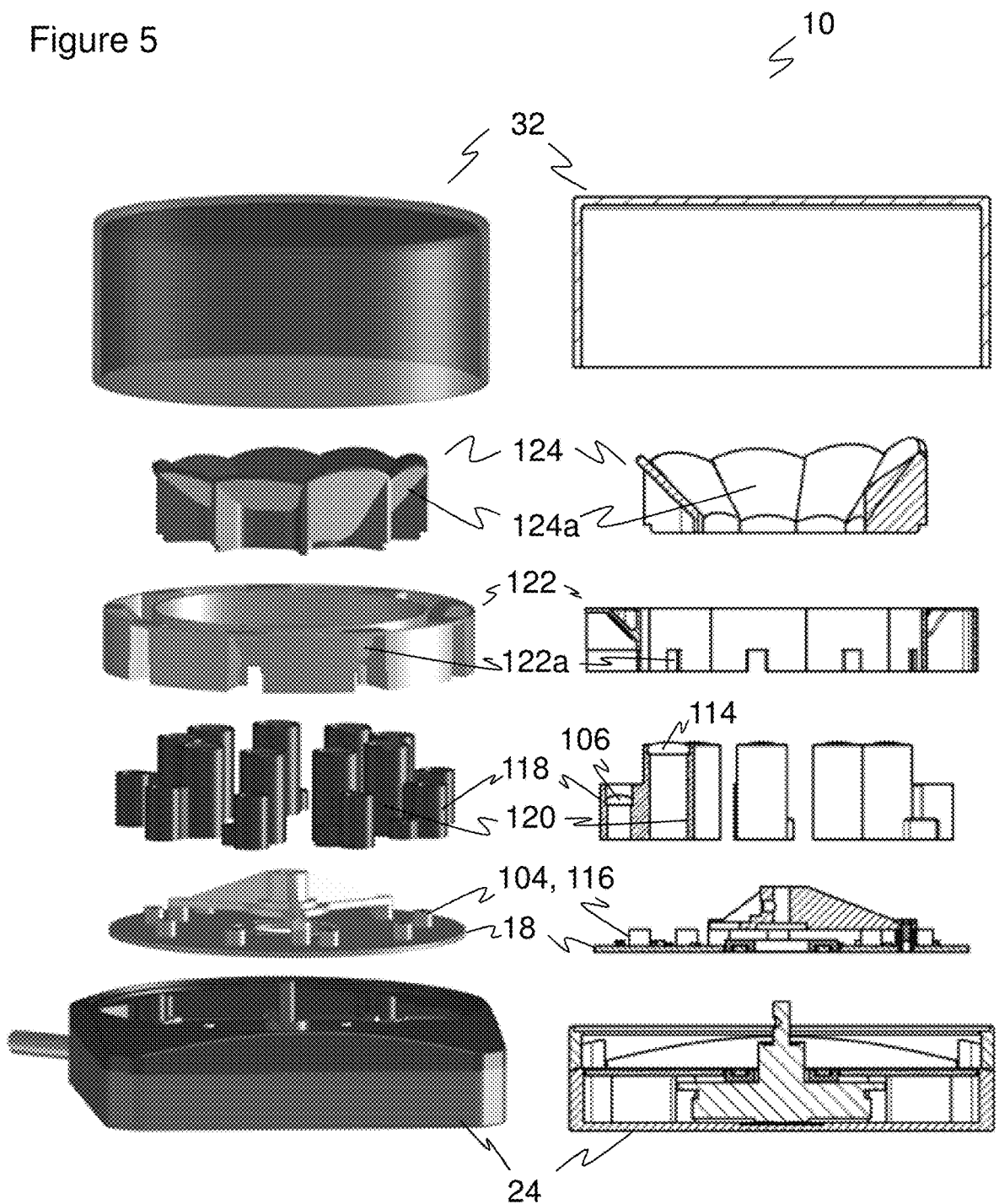
FIG. 5 a schematic exploded representation of the subassemblies of a laser scanner with scanning modules in accordance with FIG. 4.

FIG. 5 schematically shows subassemblies of an embodiment of a sensor 10 in accordance with FIG. 4 in an exploded representation, and indeed as a three-dimensional view at the left and as a sectional representation at the right.

A cover hood or front lens 32 is independent of the specific configuration of the scanning planes 14 and protects the interior of the sensor 10. The front screen 32 can satisfy an optical filter effect to reduce extraneous light depending on the material selection.

The reception mirror wheel 124 defines the angles of elevation or the direction of detection of the individual scanning modules 100 by means of the inclined or tilted reception mirrors 124a. The term mirror wheel also becomes understandable in this representation. Such a common carrier for all the reception mirrors 124a is particularly advantageous, but it would also be possible to provide carriers for the reception mirrors 124a in each case per scanning module 100 or group of scanning modules 100.

The transmission mirrors 122a of the transmission mirror wheel 122 are aligned in accordance with the associated reception path. Each scanning module 100 thus detects a scanning plane 14 at a specific angle of elevation. A plurality of individual carriers could again be used instead of the transmission mirror wheel 122.

An optical arrangement of transmission optics 106 having a transmission tube 118 and a reception optics 114 having a reception tube 120 belongs to each scanning module 100 to hold the optical elements at a defined distance from the light transmitter 104 and from the light receiver 116 and to shield the transmission path and the reception path from one another. These optical arrangements are preferably implemented as standard front assemblies.

The light transmitter 104 and the light receiver 116 are fastened to the rotating circuit board 18 directly or by means of a modular circuit board 102 and are electrically contacted. The arrangement or mounting takes place at defined positions and distances that match the optical arrangement thereabove and permit their fastening to the rotating circuit board 18. A functional light sensor, in particular a distance sensor in accordance with a time of flight process, is thus formed together with the optical arrangement.

The base unit 24 acting as a base housing includes the control and evaluation unit 28, the drive 24, if it is not integrated in the rotating circuit board 18, and a support and holders that ensure a mechanically robust positioning of the subassemblies with respect to one another.

The scan position parameters by which the scanning planes 14 are fixed, namely the angle of view and the angular distance, are determined by the angle of elevation and thus ultimately by the transmission mirror wheel 122 and the reception mirror wheel 124. An adaptation of the scanning plane configuration to a specific application takes place solely by changing the angle of inclination of the transmission mirrors 122a and of the reception mirrors 124a. All the other subassemblies can remain untouched here.

Figure 6:
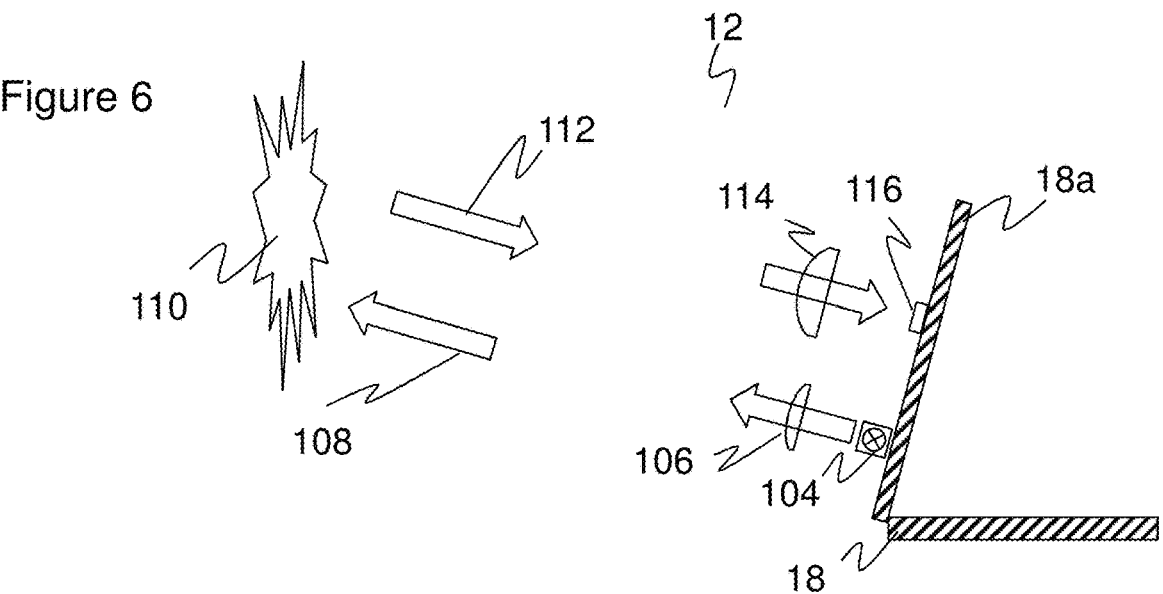
FIG. 6 a sectional representation of a scanning module on an inclined section of the base plate.

FIG. 6 shows a sectional representation of a further embodiment of a scanning module 100. Unlike the scanning module in accordance with FIG. 2, no mirror wheels 122, 124 and mirrors 122a, 124a are provided here. Elements furthermore present are marked by the same reference numerals and will not be explained again. A shielding and a channel separation by a transmission tube 118 or reception tube 120 would also be conceivable in a supplementary manner here.

Instead of a deflection by mirrors 122a, 124a, in the embodiment in accordance with FIG. 6, the angle of elevation is set in that the light transmitter 104 and the light receiver 116 are accommodated on movable or flexible sections 18a of the rotating circuit board 18 that can also be called circuit board lugs. These movable sections 18a are inclined and subsequently fixed such that the transmitted light beam 108 and the remitted light beam 112 are transmitted and received at a desired angle of elevation. The configurations of scanning planes 14 can thus also be implemented with different angle of elevation. It is also conceivable in another respect to combine inclined flexible sections 18a in accordance with FIG. 6 with transmission mirrors 122a and reception mirrors 124a. A coaxial variant is likewise conceivable.

Figure 7:
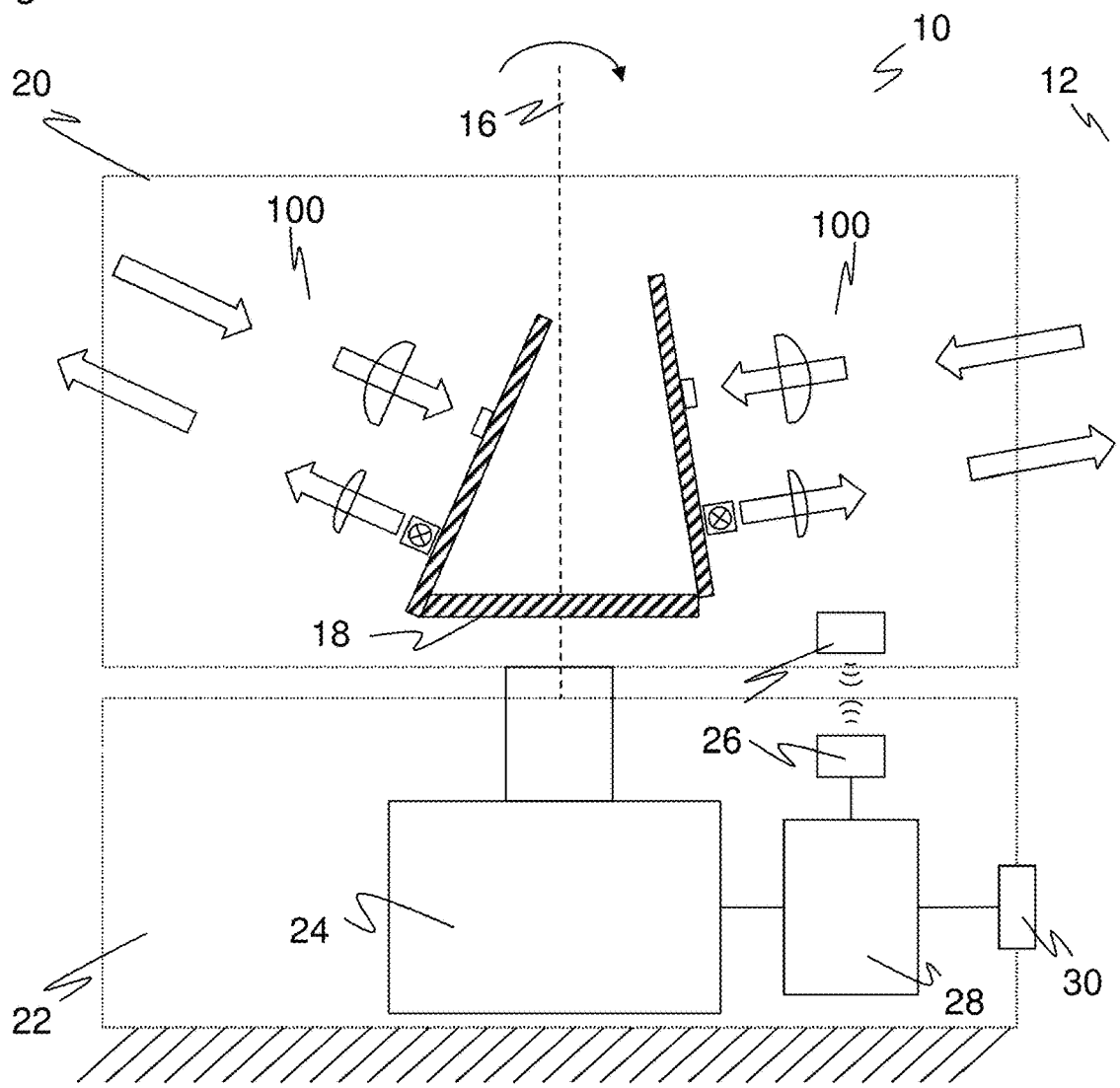
FIG. 7 a sectional representation of a further embodiment of a laser scanner with scanning modules in accordance with FIG. 6.

FIG. 7 shows a sectional representation of a sensor 10 having the scanning modules 100 in accordance with FIG. 6. The sensor 10 has already been explained with respect to FIG. 4; the scanning modules 100 with respect to FIG. 6.

Figure 8:
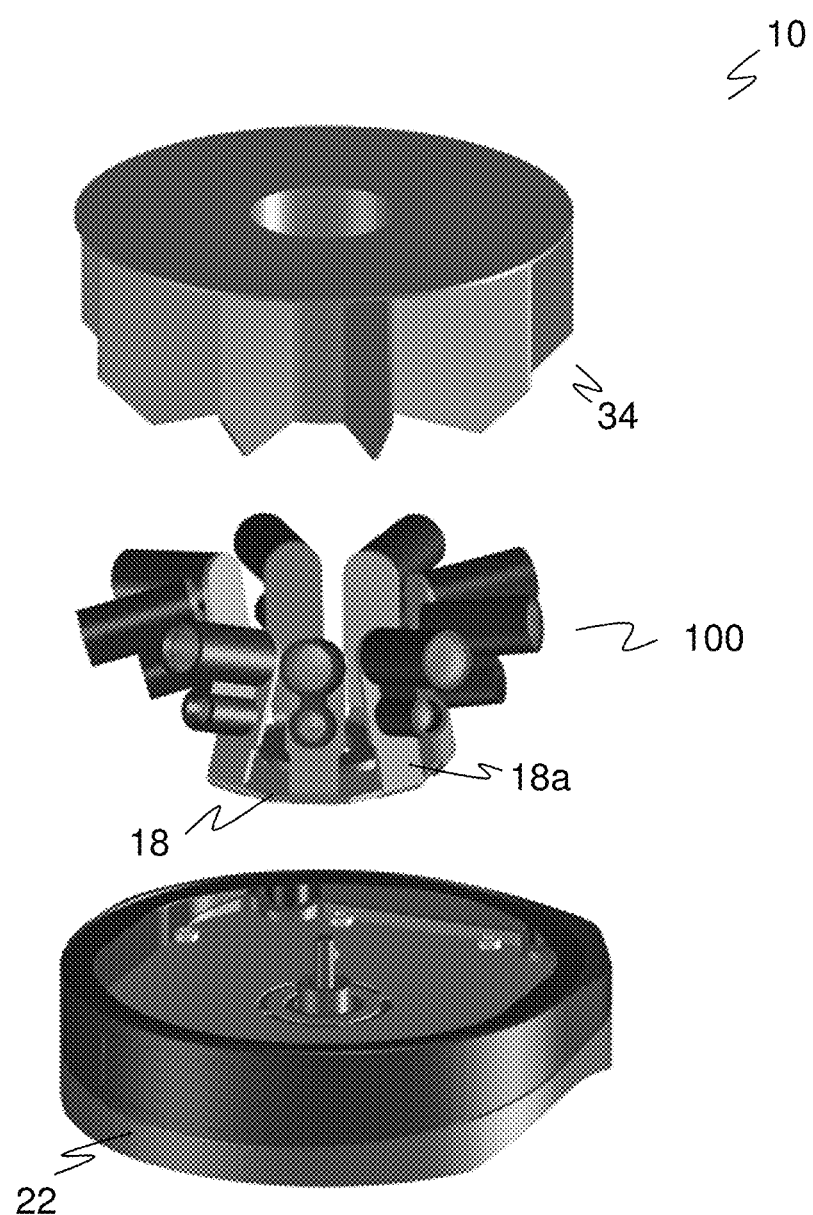
FIG. 8 a schematic exploded representation of the subassemblies of a laser scanner with scanning modules in accordance with FIG. 7.

FIG. 8 shows the subassemblies of the laser scanner in accordance with FIG. 7 in a schematic three-dimensional exploded representation. It can be easily recognizable at the center how the inclined sections 18a are inwardly kinked or folded to different degrees as circuit board lugs to achieve the desired angle of elevation. A divider wheel 34 that shields the scanning modules 100 from one another is provided as an optional additional element. This mirror wheels 122, 124 already take over this function in the other embodiment in accordance with FIG. 4. The divider wheel 34 can have suitably inclined surfaces at which the movable sections 18a are fastened to thus fix the desired angle of elevation.

The invention claimed is:

1. An optoelectronic sensor for detecting objects in a monitored zone,
    wherein the sensor has a scanning unit that is movable about an axis of rotation, the scanning unit having a plurality of scanning modules accommodated therein for a periodic scanning of the monitored zone and for a generation of corresponding received signals and the scanning unit having a control and evaluation unit for acquiring information on the objects from the received signals;
    wherein the scanning modules each comprise a light transmitter for transmitting a light beam and a light receiver for generating a respective received signal from the light beam remitted by the objects;
    and wherein the scanning modules are arranged on a section of a base plate of the scanning unit changeable in its inclination, the base plate being a rotating circuit board in a plane perpendicular to the axis of rotation and comprising movable or bendable sections in order to incline or tilt the sections out of the plane.

2. The optoelectronic sensor in accordance with claim 1, wherein the optoelectronic sensor is a laser scanner.

3. The optoelectronic sensor in accordance with claim 1, wherein the scanning modules are of identical design among one another.

4. The optoelectronic sensor in accordance with claim 1, wherein the scanning modules are arranged offset from one another in the peripheral direction about the axis of rotation.

5. The optoelectronic sensor in accordance with claim 1, wherein the scanning modules are mounted in annular form on the rotating circuit board.

6. The optoelectronic sensor in accordance with claim 1, wherein an annular divider wheel having angular segment dividers is arranged above the circuit board, said angular segment dividers separating the light beams of the scanning modules from one another.

7. The optoelectronic sensor in accordance with claim 6, wherein the divider wheel is shaped such that the changeable sections are thereby fixed with an inclination fixed by the shape.

8. The optoelectronic sensor in accordance with claim 1 that has two to ten scanning modules.

9. The optoelectronic sensor in accordance with claim 1, wherein angles of elevation between −30° and +30° can be set for the scanning modules.

10. The optoelectronic sensor in accordance with claim 1, wherein the scanning modules each have exactly one light transmitter and light receiver.

11. The optoelectronic sensor in accordance with claim 1, wherein the control and evaluation unit is configured to determine a distance of the object from a time of flight between the transmission of the light beams and the reception of the remitted light beams.

12. A method of detecting objects in a monitored zone that is periodically scanned with the aid of a scanning unit movable about an axis of rotation and said scanning unit having a plurality of scanning modules accommodated therein,
    wherein the scanning modules each transmit a light beam, after remission at the objects each of the scanning modules receive said light beam again as a remitted light beam, and each of the scanning modules generate a respective received signal; wherein the received signals are evaluated to acquire information on the objects,
    and wherein a respective section of a base plate of the scanning unit that is changeable in its inclination and on which a respective scanning module is arranged is inclined in accordance with the angle of elevation, the base plate being a rotating circuit board in a plane perpendicular to the axis of rotation and comprising movable or bendable sections in order to incline or tilt the sections out of the plane.

* * * * *